United States Patent
Patecell

[11] 3,976,114
[45] Aug. 24, 1976

[54] SECTIONAL RUN-FLAT TIRE INSERT WITH COUPLING MEANS, PERMITTING AUTOMATIC INSTALLATION

[76] Inventor: Theodore C. Patecell, 3352 156th St., Flushing, N.Y. 11352

[22] Filed: May 22, 1975

[21] Appl. No.: 579,793

[52] U.S. Cl. .............................................. 152/158
[51] Int. Cl.² ........................................ B60C 17/04
[58] Field of Search ............................ 152/152, 158

[56] References Cited
UNITED STATES PATENTS

| | | | |
|---|---|---|---|
| 2,137,910 | 11/1938 | Hautala | 152/158 |
| 2,165,810 | 7/1939 | Paselk | 152/158 |
| 2,241,858 | 5/1941 | Hruska | 152/158 |
| 3,635,273 | 1/1972 | Patecell | 152/158 |
| 3,828,836 | 8/1974 | Bradley | 152/158 |

Primary Examiner—Drayton E. Hoffman
Attorney, Agent, or Firm—Howard E. Thompson, Jr.

[57] ABSTRACT

A run-flat insert or safety roller for inflatable tires comprising a plurality of arcuate members which, when clamped in end to end relation circumferentially envelop the wheel or rim in a manner to rotate therewith in normal operation but to slip circumferentially thereof when riding on a deflated tire, is provided with circumferentially engageable lock means permitting partial assemblage of the insert within a tire in advance of mounting the tire on a wheel or rim and completion of said insert assemblage, to circumferentially envelop said wheel or rim, by application of radially opposed forces to outer surfaces of the mounted but uninflated tire.

The circumferentially engageable lock means enables the run-flat insert to be clamped to the rim by novel procedures compatible with existing automatic tire mounting equipment of automotive assembly lines. Strategically located apertures adjacent ends of the arcuate members, and receiving leverage members extending perpendicularly to the plane of the arcuate members permit the tire bead to be pried to the side, thereby providing access to the joint, to provide manual closing of said lock means when desired.

25 Claims, 14 Drawing Figures

SECTIONAL RUN-FLAT TIRE INSERT WITH COUPLING MEANS, PERMITTING AUTOMATIC INSTALLATION

This invention relates to a run-flat insert or safety roller for inflatable tires comprising a plurality of arcuate members which, when clamped in end to end relation circumferentially envelop the wheel or rim in a manner to rotate therewith in normal operation but to slip circumferentially thereof when riding on a deflated tire and which is provided with circumferentially engageable lock means permitting partial assemblage of the insert within a tire in advance of mounting the tire on a wheel or rim and completion of said insert assemblage, to circumferentially envelop said wheel or rim, by application of radially opposed forces to outer surfaces of the mounted but uninflated tires.

The circumferentially engageable lock means enables the run-flat insert to be clamped to the rim by novel procedures compatible with existing automatic tire mounting equipment of automotive assembly lines. Strategically located apertures adjacent ends of the arcuate members, and receiving leverage members extending perpendicularly to the plane of the arcuate members permit the tire bead to be pried to the side, thereby providing access to the joint, to provide manual closing of said lock means when desired.

More particularly the invention relates to a run-flat tire insert of the class described wherein such partial assemblage of the insert within a tire is facilitated by one or more joints which comprise interfitting and generally circular coupling portions with adjustable axial clamping means centrally thereof which permit essentially co-planar pivotal movement between said partially assembled arcuate members. Still more particularly the invention relates to a run-flat tire insert of the class described wherein the arcuate members carrying said circumferentially engageable lock means also include interfitting and generally circular coupling portions with the lock means offset with respect to the axial center thereof whereby removal of a remote axial clamping means, and separation of the arcuate member ends joined thereby, facilitates disengagement of said circumferentially engageable lock means.

BACKGROUND OF THE INVENTION

Attempts have been made for many years to devise effective means inserted within an inflatable tire for permitting safe and extended driving in the event of blowout or other deflation of the tire. Such past efforts have been extensively discussed in my prior U.S. Pat. No. 3,635,273 dated Jan. 18, 1972 and the more recent reissue thereof, U.S. Pat. No. RE 28,196 dated Oct. 15, 1974, so this background need not be here repeated.

The structure of the tire insert disclosed and claimed in said prior patent and reissue thereof is unique in providing an inexpensive, easily mountable tire insert formed of a plurality of arcuate members which firmly and directly engage the wheel or rim in a manner to rotate with (i.e. as part of) the wheel or rim under normal conditions when driving on an inflated tire, but to slip circumferentially of the wheel or rim when the insert becomes load bearing by reason of deflation of the tire. The insert, in other words, functions as a roller in such load bearing operation with the outer surface of the insert rolling with little or no relative slippage along the inner surface of the tire tread and substantially all slippage necessary to account for the difference in circumference of the inner surface of the tire tread and the outer surface of the insert taking place between the inner surface of the insert and the wheel or rim. This type of slippage is facilitated by selection of appropriate materials, suitably plastics such as ultra high molecular weight (hereinafter referred to as UHMW) polyethelene or polypropylene, at the inner periphery of the insert. Composite structural materials have also been used.

Inserts of this structure have been extensively used and tested and have been shown to effectively prevent loss of control in the event of blowout at speeds of the order of 70 to 75 m.p.h. and to permit extended driving at moderate speeds without damage to the insert or further damage to the tire (beyond such damage as may have caused a sudden deflation). In the event of a slow leak, such as is sometimes encountered by parking too close to a curb, one may drive to a service station for replacement air and be assured that there has been no damage to the tire by reason of driving while the tire was deflated.

In most instances a motorist experiencing a flat tire will not be more than 10 or 15 miles from an appropriate service area for tire repair. If traveling 35 to 40 m.p.h., the motorist should not create any hazard even on a busy highway. The above mentioned tire inserts readily and repeatedly permit this type of operation. In fact, it has been found that sustained travel for about 20 miles at 35 m.p.h. is necessary before there is sufficient heat build up to interfere with the intended function of the tire insert. By including within the assemblage a small amount of water soluble lubricating fluid, such for example as a liquid nonionic surfactant, it is possible for the tire insert to meet the arbitrary and seemingly unrealistic objectives of the tire and auto industry of being capable of sustained run-flat driving for 50 miles at 50 m.p.h. with a one-inch cut in the sidewall causing zero internal air pressure.

Based on this type of performance in extensive testing, considerable interest in the above mentioned insert has been generated within the tire and automotive industries, but one limitation prevents automotive companies from adopting the improved tire insert as original equipment thereby eliminating the need for the extra tire and wheel now conventionally carried by every motorist. This problem is the substantial investment in equipment for automatically mounting inflatable tires on wheels or rims and the impossibility, with a structure which requires clamping the insert to the wheel or rim while the tire is half mounted thereon, of accomplishing this step during the automatic tire mounting operation. The production delays and labor costs for manual installation are not acceptable to a new car manufacturer.

While this problem in no way limits use of the insert on existing motor vehicles or the provision of such inserts as optional equipment to be installed at the point of delivery to the customer desiring such equipment, it will be apparent that there is a real need for making this safety feature acceptable and practical for inclusion as original equipment in the manufacture and assemblage of motor vehicles.

THE INVENTION

It has now been discovered in accordance with the present invention that with a run-flat insert or safety roller for inflatable tires of the general type disclosed in said reissue Pat. No. RE 28,196, in which a plurality of arcuate members are pivotally joined together in end to end relation to circumferentially engage the wheel or rim on which a tire is mounted, it is possible for such inserts to be installed as initial equipment, without interference with automatic tire mounting equipment, by providing in the insert assemblage an automatically coupled joint between co-acting ends of said arcuate members. The provision of a reliable but inexpensive automatic joint becomes practical by reason of interfitting means at the ends of the arcuate members which establish circumferential alignment of the arcuate members, and by reason of the manner in which the joint or joints remote from the automatic coupling joint are pivotally coupled on axes parallel to the axis of the wheel or rim, so as to permit relative swinging movement of the partially assembled arcuate members in a plane substantially perpendicular to the axis of the wheel or rim. With the arcuate members having this type of alignment and relative movement as partially assembled, an automatic joint is provided having interengaging means which permit relative movement between interfitting arcuate member ends as they circumferentially approach each other, and further establish an interlock there-between when such movement toward each other has sufficiently advanced so that the inner periphery of the arcuate members firmly engages the associated wheel or rim.

The employment of lock means interengageable by such relative circumferential movement makes it possible for the first time for a plurality of arcuate members to be assembled within a tire, the tire then mounted on a wheel or rim by conventional automatic tire mounting equipment so that the partially assembled insert is enclosed within the assemblage, and for the final assemblage of the insert, and closure of the automatic joint, to be accomplished by applying pressure externally of the tire to compress spaced portions of the tread into bearing engagement with the arcuate members thereby forcing the automatic joint ends into interlocking engagement. In instances where the insert comprises two arcuate members, applicable to most passenger cars and other small vehicles, such external forces should be applied at diametrically opposed points approximately midway between the ends of the respective arcuate members. If desirable, external forces can be applied at four 90° locations around the tread, thereby eliminating the need for accurate positioning of two opposed forces with respect to the arcuate members.

In the case of larger inserts such as might be used for trucks and other large vehicles where it may be practical to use three or even four arcuate members to form the complete insert, the nubmer of such external forces to be applied should be at least equal to the number of arcuate members and directed at substantially the midpoint of each arcuate member so that the externally applied forces effect the desired swinging movement at the pivotally coupled joints and engagement of the automatic joint as the arcuate members are thus brought into close circumferential engagement with the wheel or rim.

The ends of the arcuate members which form the automatic joint should have a basic interfitting structure providing curved contours permitting relative pivotal movement when an adjacent pivotally coupled joint is disconnected. This can be accomplished either by employing interfitting and overlapped circular portions of reduced thickness as disclosed in said U.S. Pat. No. RE 28,196 or by employing a modified end structure for the arcuate members as more fully hereinafter described in which the full thickness of one arcuate member having a convexly curved end abuts with the full thickness of an arcuate member with concave curvature at the end thereof. Coplanar alignment and circumferential interlock of the interfitting ends is provided by a bearing flange extending beyond the concave end of an arcuate member having an offset tooth engageable with ratchet means adjacent the convex end of an opposed arcuate member. Fittings with a plurality of interengaging ratchet teeth can also be attached to each of the arcuate member ends to be joined.

With the form of construction shown in U.S. Pat. No. RE 28,196, each arcuate member end forming the automatic joint will carry one toothed flange and one ratchet means, whereas with the modified, full thickness interfit of arcuate members, two toothed flanges will be disposed at opposed sides of the member having concave end curvature, and two ratchet means will be disposed on opposed surfaces of the member having convex end curvature. The offset teeth of said flanges and the ratchet means are spaced from the center of curvature of said interfitting convex and concave end portions in circumferential direction with respect to the axis of the assembled arcuate members and should have a minimum dimension in a direction radially of said assembled arcuate members. This location and general size permits the toothed flanges to readily engage and interlock with the ratchet means as the arcuate member ends are moved toward each other, while at the same time permitting disengagement, when a remote pivotal coupling has been disconnected, by pivotal movement of the arcuate members about the axis of the automatic joint.

It should be noted in this connection that the ratchet means should preferably have a plurality of ratchet teeth for selective engagement by the coacting toothed flange as the assembled arcuate members are brought into firm circumferential engagement with the wheel or rim. In inserts for smaller wheels such as encountered in pleasure automobiles and the like, the interengaged tooth and ratchet means can be of straight or linear contour, but in larger inserts such as those for truck and bus wheels and the like where the interengaging tooth and ratchet means must be considerably larger and wider, it is desirable that the tooth and ratchet means have a curvature with the radius of curvature reflecting the distance of the tooth and ratchet means from the pivot center of the automatic joint. Such curvature in the tooth and ratchet means of larger inserts will facilitate pivotal disengagement of the automatic joint, when desired, as more fully hereinafter described.

In instances in which the lock joint comprises interfitting full thickness ends of the arcuate members having convex and concave curvature, the other pivotally coupled joint or joints in the assemblage of arcuate members can suitably also be of similar construction. In such event, the arcuate member end of concave curvature would carry extending flanges at opposed surfaces thereof to closely engage opposed surfaces of the coacting arcuate member end having convex curvature. Coupling and pivotal movement of these interfitting parts involves detachable bolt means passing through aligned apertures in the convex part and in the flanges of the concave part at the center of curvature thereof, with one of said flanges preferably carrying threaded means for anchoring a bolt inserted through the opposed flange.

Regardless of the particular type of pivotally coupled and automatic lock joints provided in an assemblage of arcuate members forming a complete tire insert, it is desirable for manual installation and dismounting purposes to provide, adjacent each of the arcuate member ends and toward the outer periphery of the assemblage, an aperture extending through the arcuate member substantially perpendicularly to the plane thereof and having a diameter of the order of 9/16 to ⅝ inch to receive a cylindrical rod of the conventional jack-handle type. These strategically sized and located apertures greatly facilitate working with tire inserts of the type described during both mounting and dismounting operations when the tire is half mounted on the wheel or rim, i.e. one tire bead between the rim flanges and the other tire bead outside the rim flanges. Inserting a jack-handle into one of the apertures against the radial tension of the tire bead can support the tire bead in an out-of-the-way position providing easy access to a pivotally coupled joint when there is a need for inserting or removing the coupling bolt as for example when there has been tire trouble on a wheel equipped with the automatic lock insert, and disengaging a bolted coupling is a step preliminary to disengaging the automatic lock.

These apertures are also of special advantage in the manual mounting of tire inserts whether assembled completely by bolts or containing the automatic lock. In such instances two cylindrical rods or jack-handles are inserted in the apertures at both sides of the joint to be closed, thereby holding the tire bead to the side and providing free access to the joint. By then placing adjustable loop means around the protruding rods or jack-handles and applying divergent force to the projecting ends thereof, substantial force can readily be applied to the arcuate member ends to either properly engage the tooth and ratchet means of an automatic lock or properly align the apertures for inserting a coupling bolt at the particular joint. This method also forces the tire bead which is enveloping the rim out of the drop center to permit seating of the insert in the drop center.

Thus it will be seen that the automatic lock construction and strategically located apertures at the ends of the arcuate members adds a new dimension to the versatility of the run-flat insert. It makes possible for the first time installation using automatic tire mounting equipment, without in any way sacrificing versatility in manual mounting and dismounting which can be extremely important in all situations not involving initial installation on new automotive equipment.

The invention will be more fully understood from a consideration of the accompanying drawing in which the new automatic joint for run-flat tire inserts is clearly illustrated with the various parts thereof identified by suitable reference characters in each of the views, and in which.

Figure 1:
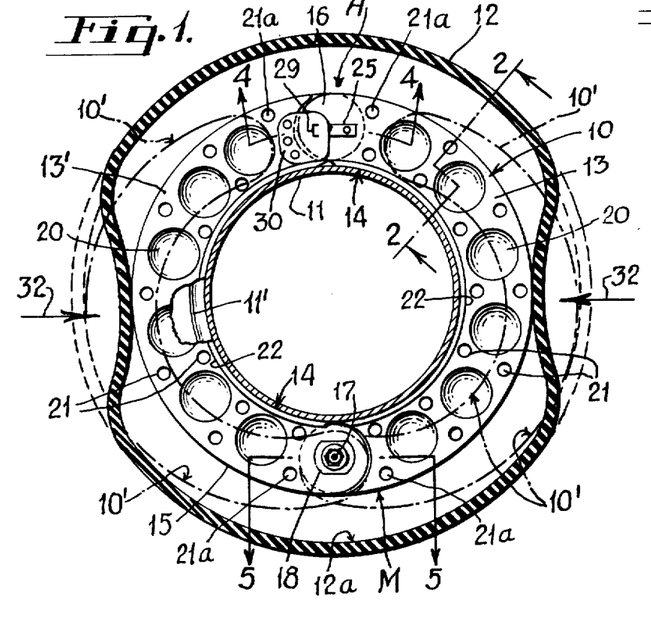
FIG. 1 is a sectional view through a tire rim and run-flat insert assemblage, showing in dotted lines the position of the insert before applying external pressure and in full lines the position of the insert when external pressure is applied as indicated.

As illustrated in FIG. 1 of the drawing a run-flat insert or safety roller 10 has been shown within the assemblage of a wheel or rim 11 and inflatable tire 12. The insert or roller 10 comprises a plurality of arcuate sections 13, 13' which are secured together in end to end relation to form a ring, the inner periphery 14 of which firmly engages the wheel or rim 11 between the flanges 11' thereof, and the outer periphery 15 of which is in spaced relation to the inner surface 12a of an inflated tire but adapted to bear against the surface 12a when driving on a deflated tire.

Figure 3:
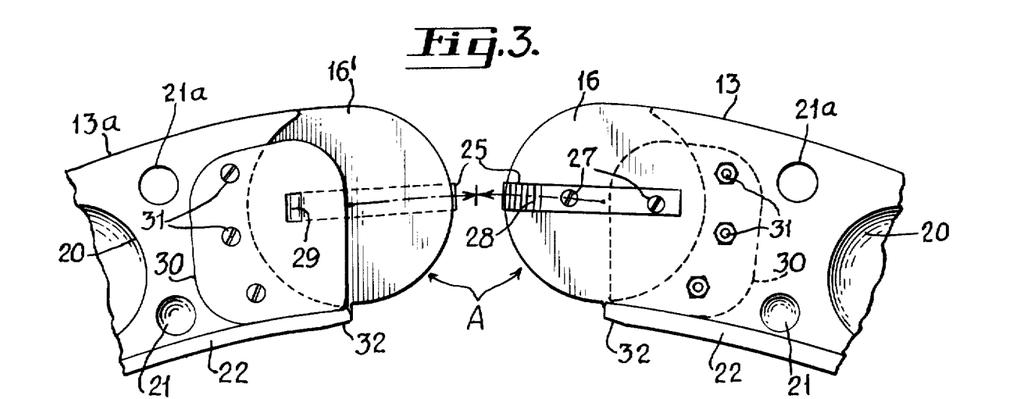
FIG. 3 is a fragmentary view of the automatic lock portions of the insert in separated or unlocked position.
Figure 4:
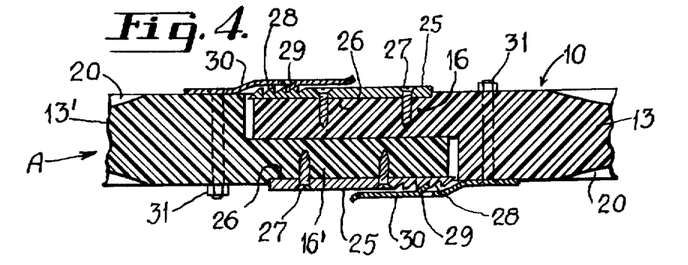
FIG. 4 is a fragmentary sectional view substantially on the line 4—4 through the interengaged lock joint.
Figure 5:
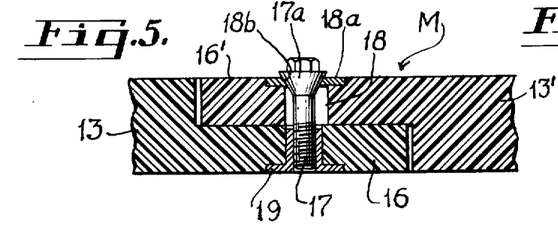
FIG. 5 is a fragmentary sectional view substantially on the line 5—5 through a pivotal joint of the insert remote from the automatic joint.

The arcuate sections or members 13, 13' have end portions 16, 16' of reduced thickness and generally circular contour as clearly shown in FIGS. 3, 4 and 5. This interfitting relationship serves to establish coplanar alignment of the arcuate member 13, 13', to permit coplanar pivoting of said members about axes passing substantially through the centers of said circular end portions 16, 16', and to provide continuous structure across the joint, with no gap to cause rotational thump. One pair of end portions, as identified at A in FIGS. 1, 3 and 4 is provided with a new automatic lock means of the present invention, while end portions remote from the automatic coupling A, as denoted M in FIGS. 1 and 5 are adapted for manual coupling by means of a tapered, headed bolt 17 passing through an aperture 18 centrally of end 16' and into a threaded anchor means 19 mounted centrally of end 16.

Figure 5A:
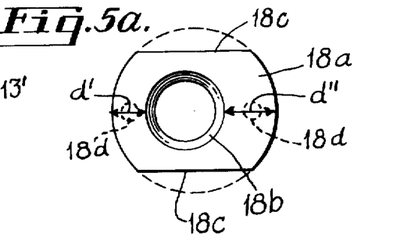
FIG. 5a is a plan view of a washer insert component as shown in FIG. 5.

As disclosed in said reissue Pat. No. RE 38,196, the bolt 17 can have an elongated taper and coact with a tapered aperture 18 in the end 16'. In an alternate and improved construction the aperture 18 is straight sided and substantially larger than the bolt 17 for insertion clearance, and aligned with a washer 18a which is detachably embedded in the end 16' and has a tapered aperture 18b therein engaged by a short taper 17a adjacent the head of the bolt 17. The washer 18a has flattened sides as seen at 18c in FIG. 5a. The aperture 18b is offset in the washer 18a to provide a dimension d' which is slightly smaller than d'', and it will be apparent that by changing the orientation of the washer 18a, this can vary the extent of overlap of the ends 16, 16' when clamped together, and hence the circumference of the assembled insert. A round washer with an offset aperture 18b, and two screw holes fore and aft as shown in dotted lines at 18d in FIG. 5a, can substitute for the flat sided washer. This type of interchange, plus interchanges with the washers 18a having different dimensions d' and d'' facilitate the obtaining of optimum clamping engagement of the assembled insert with a wheel or rim, i.e. engagement which prevents rotation of the insert with respect to the wheel or rim when driving on an inflated tire, but permits such rotation when driving on a deflated tire.

In the structure as illustrated employing two arcuate members there is one automatic joint A and one manual joint M. In instances where the insert 10 is fashioned from three or more arcuate members joined in end to end relation to form a rim or wheel enveloping ring, the assemblage will still have only one automatic joint A with all joints remote therefrom being of the manual M type.

The arcuate sections or members 13, 13' as described in said U.S. Pat. No. RE 28,196 should have inner peripheries 14 and outer peripheries 15 formed of plastic material, suitably UHMW polyethylene or polypropylene. At the inner periphery this assures a type of clamping to the wheel or rim which causes the insert to rotate with the wheel or rim under normal driving conditions, but to slip on the rim and synchronize with the tire tread when driving on a deflated tire. At the outer periphery the plastic acts more as a cushioning agent when driving on a deflated tire to minimize damage to the inside of the tire tread due to the concentrated pressure of road irregularities, etc. To this end the outer peripheral edges are suitably rounded as seen at 15a in FIG. 2.

Figure 2:
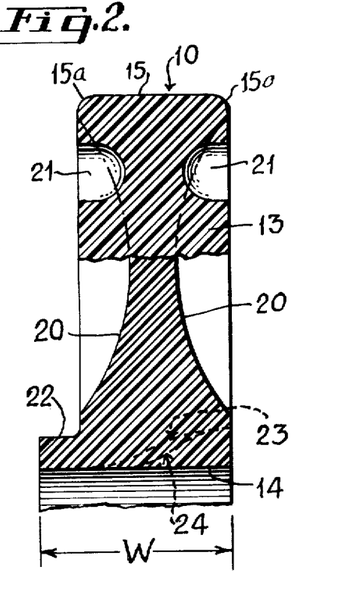
FIG. 2 is a sectional view through the insert substantially on the broken line 2—2.

As further described in U.S. Pat. No. RE 28,196 the inner and outer peripheries can be connected by a metal or other, separately fashioned load bearing structure or by a unitary mass of the same plastic material as shown in FIG. 2 which permits substantially complete fashioning of an arcuate section or member by plastic molding techniques. The large depressions 20 and small depressions 21 spaced longitudinally of both sides of the arcuate members are intended to aid in molding and to provide a balance of minimum weight and appropriate strength to withstand both the centrifugal forces of high speed driving and the compressions forces of driving, when load bearing, on a deflated tire. It should be noted that the outer small depressions adjacent the arcuate section ends, at the locations 21a in FIGS. 1 and 3, are preferably replaced by apertures extending through the arcuate members to facilitate manual mounting of the insert as hereinafter described.

When forming an arcuate section or member 13 by plastic molding techniques the inner periphery 14 is preferably extended axially by an integral flange 22 so that the width W shown in FIG. 2 will provide the maximum wheel or rim drop-center engagement, and provide clearance for one tire bead installation. There is considerable variation in the contour of drop center wheel rims of the same diameter and for one auto make the inner periphery may require shaping or machining to a contour such as shown at dotted line 23, whereas for another auto make it may be necessary to machine both the rib 22 and inner periphery as shown at dotted line 24. The important thing is that the insert 10, when in clamped engagement with the wheel or rim 11, is supported against any axial or tilting movement with respect to the wheel or rim, but free to rotate circumferentially thereof as load bearing forces cause slippage between the inner periphery 14 and the wheel or rim 11.

Considering now the details of the new automatic lock construction it will be noted that each of the end extensions 16, 16' is provided with a first coupling member 25, suitably in the form of an elongated metal bar partially embedded in the end extension as seen at 26, and securely anchored thereto by fasteners 27. The elongated bars 25 are oriented to pass over the center of the circular end extension 16, 16' and be substantially perpendicular to a radius of the insert 10 passing through such center as clearly shown in FIGS. 1 and 3. At its end extremity, and spaced from the center of the associated end extension 16, 16' as clearly shown in FIGS. 3 and 4 each bar 25 is provided with a plurality of ratchet teeth 28 which form the female lock element.

The female lock elements 28 are engaged by male lock elements in the form of inward offset members 29 on enlarged spring metal plates 30 secured to the arcuate members 13, 13' by suitable fasteners 31 and extending over the reduced thickness ends 16, 16' approximately as far as the centers thereof, as clearly seen in FIGS. 3 and 4. The plates 30 are suitably fashioned from tempered steel to have the necessary yieldable or resilient properties to permit the offset male lock element 29 to ride over initial ratchet teeth 28 until the proper tooth is engaged ie.e when movement of the ends 16, 16' toward each other has brought the inner periphery 14 of the insert into close engagement with the wheel or rim 11.

It should be noted, however, that the resilient plates 30 perform the further important function of providing firm transverse clamping together of the overlapped ends 16, 16'. This accounts for the relatively large size of the plates 30 in spite of the fact that the locking contact is concentrated in the offsets 29. It is to be understood, however, that the relative size and shape of the plates 30 with one or more teeth, and of the bars 25 can be varied considerably, although maintaining the described location of the male and female lock elements, in order to provide the desired weight and weight distribution in the automatic lock joint A. This must substantially balance with the weight of the bolt 17 and associated components in the remote manual joint or joints M; and in arriving at desired balance it will be apparent that weight can, if necessary, be added to the bolt 17 or other parts of the manual joint M.

When installing run-flat inserts having the new automatic lock A as original automotive equipment, the procedure is substantially as follows. The two or more arcuate sections of insert 10 are placed in a tire 12 and the bolt 17 inserted and tightened at each of the manual joints M. The partially assembled insert 10 is then spread to the widest configuration possible within the tire as shown in the dotted line illustration 10 in FIG. 1. This subassemblage is then passed to the automatic tire mounting equipment and the tire 12 and insert 10 collectively mounted on the wheel or rim 11. Then, while the tire 12 is uninflated, external pressure is applied at radially spaced points, as indicated by the arrows 32 in FIG. 1 of the drawing to compress the tire 12 against the spread insert 10'. Continuing this pressure moves the arcuate members of the insert, through pivoting at the joint or joints M, to the full line position shown in FIG. 1 in which the inner periphery 14 of the insert firmly envelopes the wheel or rim 11 and the lock elements 28, 29 of joint A are properly engaged. Then, upon inflation of the tire, the wheel, tire and safety roller assemblage is ready for use.

The type of pressure required to close the automatic joint A within the tire as above described can be applied in various ways, and if specialized equipment is not available, it can be accomplished, for example, for supporting the assemblage against a wall or other structure, and applying the pressure with a car or other vehicle. Hydraulic presses or hydraulically actuated clamping jaws can also be used. Most tire mechanics at service stations, however, will prefer to close the automatic joint manually in the manner hereinafter described.

When a motorist experiences tire trouble or wants to make a switch between snow tires and regular tires, the automatic lock joint is disengaged as follows. One tire bead is first removed from the wheel or rim on the side which gives access to the bolt 17 of the manual joint M. A cylindrical rod or jack-handle is inserted into one of the apertures 21a, with the tire bead being pried aside to permit its full vertical insertion, thereby making the joint area manually accessible. Upon removing the bolt 27 and spreading of the joint ends, possible due to the pivotal action provided in the orientation of lock elements 28, 29 of the automatic joint A, the partially disassembled insert can be passed over the rim to permit removal of the tire. The arcuate members can then be pivotally separated and individually removed from the tire. Note in this connection that ends of the arcuate members 13, 13' at the inner periphery preferably have small, beveled or cut-out, portions as seen in FIG. 1 and at 32 in FIG. 3 to provide clearance for passing the partially disassembled insert over the wheel or rim flanges 11' while one rim flange is still within the tire. It should further be understood, however, that pivotal movement at automatic joint A can permit full disengagement of the joint within a partially dismounted tire (one bead removed from the wheel or rim) so that the arcuate members 13, 13' can be individually passed over the rim flange and removed from the tire.

Figure 6:
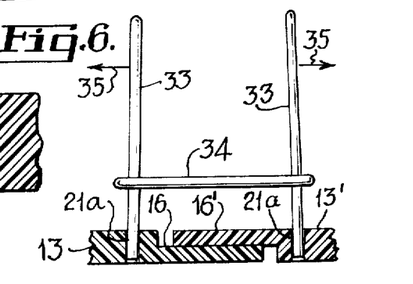
FIG. 6 is a diagramatic, fragmentary view illustrating a step in manual mounting of the insert.

When a run-flat insert has been removed for tire change or repair, and must be reinstalled under conditions where means for applying external pressure to lock the automatic joint A is not available, the following procedure is recommended. The two or more arcuate sections of insert 10 are placed in a tire 12 and the bolt 17 inserted and tightened at each of the manual joints M. The partially assembled insert 10 is then spread to the widest configuration possible within the tire as shown in the dotted line illustration 10 in FIG. 1. After passing one tire bead over the rim flange and passing the extended insert into the space between the flanges, insert elongated metal rods of the jack-handle type into apertures 21a at opposed sides of the automatic joint A as diagrammatically shown in FIG. 6. Then pass a constricting loop 34 over the two rods, and apply divergent force to the outer ends of the rods as indicated at 35 to force the lock elements 28, 29 into locking engagement. The safety roller insert is then secure to the wheel. The second tire bead is passed over the rim flange, and the assemblage is ready for inflation of the tire, and use.

The step of closing the automatic lock may require the application of considerable divergent force to the rod ends to properly seat the inner periphery 14 of the insert 10, and in so doing possibly force part of the tire bead out of the drop center of the wheel or rim. It has been found, however, that this sequence of steps, with a little practice, adds only about three minutes to the usual time for mounting a tire on a wheel or rim.

FIGS. 7 to 10 of the drawing are fragmentary views of the joint portions of arcuate members 36, 37 which assemble to form a ring-like insert in the same manner as the previously described arcuate members 13, 13'. Whereas the joint portions of the members 13, 13' employed generally circular overlapped portion 16, 16' of reduced thickness, it will be noted that the interfitting portions of the modified construction comprise full thickness ends 38 of circularly concave contour and ends 39 having a corresponding circular convex curvature. Transverse alignment of the interfitting part is provided by enlarged plates 40, suitably of yieldable spring metal secured to the concave ends 38 by suitable fasteners 41 and extending substantially beyond the concave curvature as shown.

Figures 7, 8:
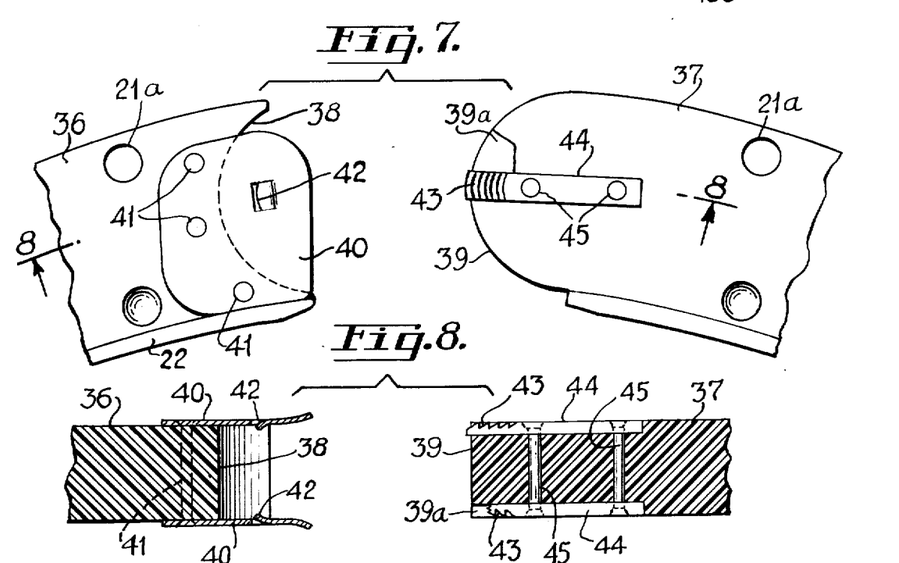
FIG. 7 is a view similar to FIG. 3, showing a modified form of lock joint having full thickness interfitting portions on the arcuate members.
FIG. 8 is a sectional view substantially on the line 8—8 of FIG. 7.

At the automatic lock joint the plates 40 are provided with inwardly offset teeth 42 which engage ratchet teeth 43 of elongated lock bars 44 secured to and embedded in opposed surfaces of the convexly curved ends 39 by suitable fasteners 45.

The engagement and disengagement of the lock joint shown in FIGS. 7 and 8 is accomplished in the same manner as engagement and disengagement of the lock joint shown in FIGS. 3 and 4 with the strategically placed apertures 21a facilitating manual closing of the lock joint when power means for applying locking pressure is not available. Shallow recesses 39a provide clearance for the teeth 42 as the joint is disengaged by divergent pivoting of the members 36, 37.

When employing the full thickness interfitting ends 38, 39 in the lock joint as shown in FIGS. 7 and 8, it is preferable to employ a similar interfitting structure in the bolted joint or joints of the assemblage. One means for accomplishing this has been shown in FIGS. 9 and 10 where the plate 40 at one side of the concave end 38 is provided with a tapered aperture 46 in alignment with threaded means 47 on plate 40' at the opposed side of the end 38 for collectively receiving a bolt 48 having a short beveled head 49 for seating with the aperture 46. The bolt 38 passes through an aperture 50 in the convexly curved end 39 which is coaxial with the radius of said convex curvature 39 and which thus permits free pivotal movement of the arcuate members 36, 37 when the parts are loosely joined by the bolts 48, 49.

As earlier described, the strategically located apertures 21a receive cylindrical rods of the jack handle type thus facilitating both free access to the joint area by prying a tire bead out of the way and also facilitating alignment of the parts for insertion of the bolt 48.

Figure 9:
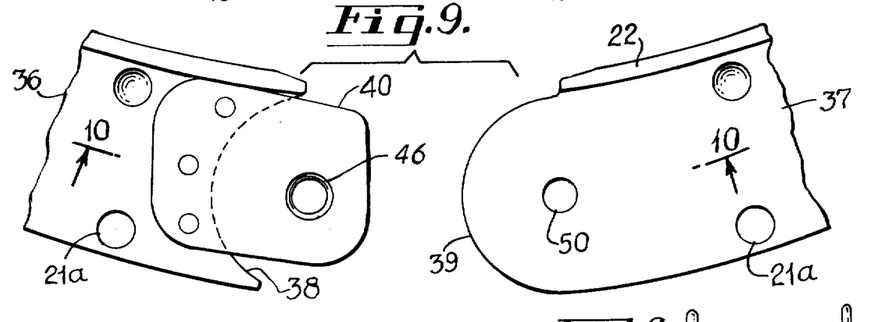
FIG. 9 is a veiw similar to FIG. 7 in which the automatic joint coupling is replaced by a bolted joint coupling.
Figure 10:
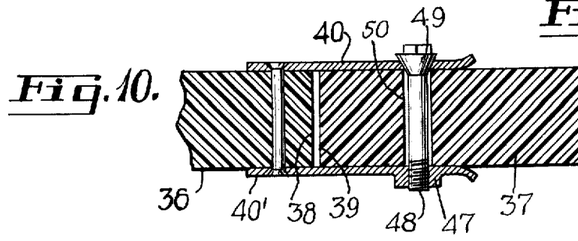
FIG. 10 is a sectional view substantially on the line 10—10 of FIG. 9.

While a consideration of FIGS. 7 and 9 indicates that one of the arcuate members 36 may have two concave ends and the other member 37 have two convex ends, it is to be understood that the arcuate members will generally be fashioned in a manner to have one concave end and one convex end. In this way it is somewhat easier to control material balance in the assemblage.

Figure 11:
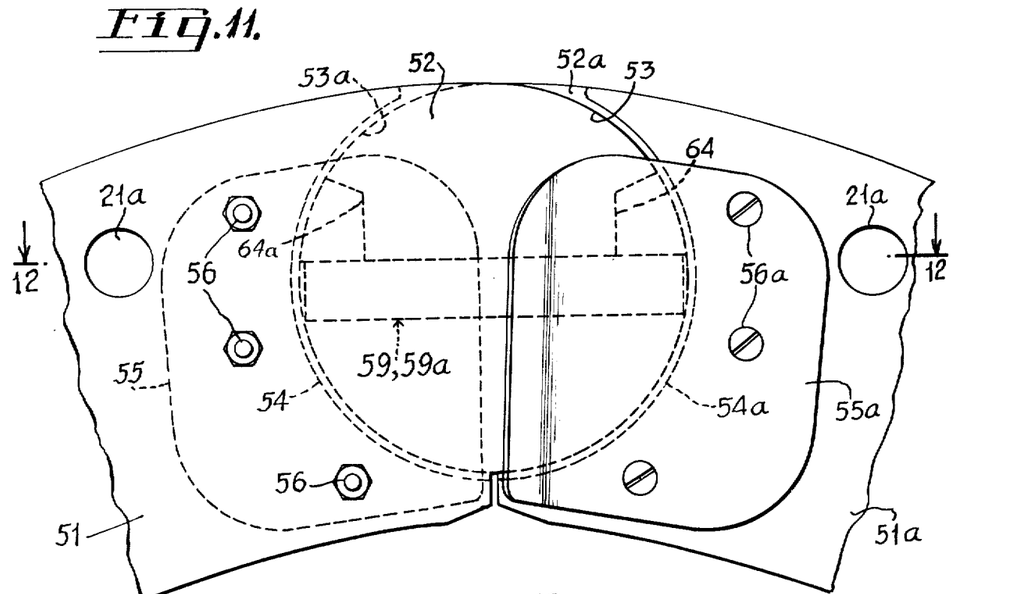
FIG. 11 is a fragmentary side view of a modified lock joint with internal lock members.
Figure 12:
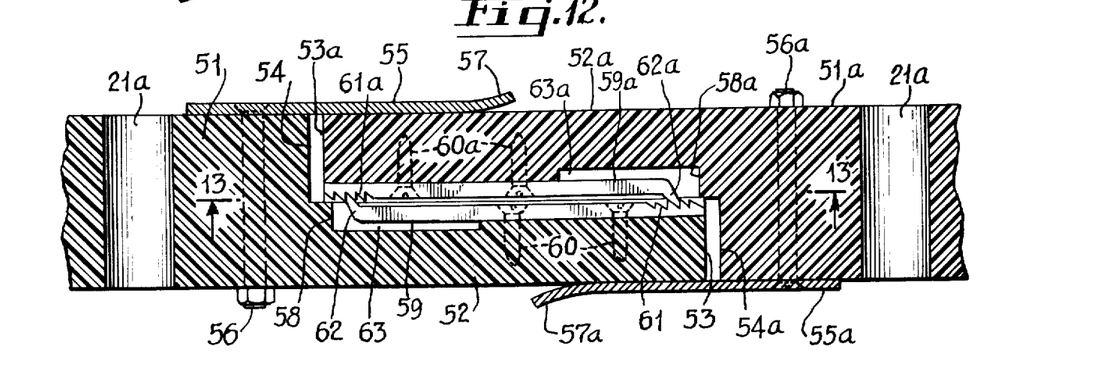
FIG. 12 is a sectional view substantially on the line 12—12 of FIG. 11.
Figure 13:
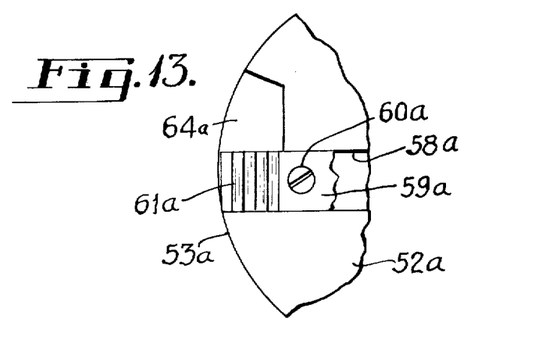
FIG. 13 is a fragmentary detail view substantially on the line 13—13 of FIG. 12.

FIGS. 11 to 13 illustrate a modified form of lock joint with what might be referred to as internal lock members. In this modification arcuate member ends 51, 51a have reduced thickness portions 52, 52a with ends 53, 53a of circular convex curvature interfitting with concavely curved shoulders 54, 54a of the opposing part. Each end portion carries an enlarged spring plate 55, 55a mounted by suitable fasteners 56, 56a, and extending substantially beyond the concave shoulder for bearing engagement with the outer surface of the interfitting reduced thickness portion as shown. Ends of the spring plates are preferably flared outwardly as seen at 57, 57a to facilitate pivotal engagement of the parts.

The inner surface of each reduced thickness portion 52, 52a has an elongated recess 35, 35a receiving a lock bar 59, 59a anchored in position as by fasteners 60, 60a and oriented in a position which extends generally circumferentially of the assemblage of arcuate members 51, 51a. Outer ends of the lock bars, adjacent the convex ends 53, 53a have a series of transverse ratchet teeth 61, 61a while the inner end of each lock bar has a projecting tooth or offset 62, 62a adapted to operatively engage one of the opposed ratchet teeth.

It will be noted that the ratchet teeth 61, 61a are recessed, thus providing no interference with swinging of the arcuate member ends 51, 51a into the interfitting arrangement shown until ratchet teeth 61, 61a reach the offsets 62, 62a of the opposing lock member. The transverse movement of the parts permitting projections 62, 62a to ride over initial ratchet teeth 61, 61a can be provided at least in part by flexure in the plates 55, 55a. The lock bars 59, 59a can also be fashioned from spring metal permitting flexure of the offset ends 62, 62a into aligned recesses 63, 63a.

Once the arcuate member ends have been moved toward each other to engage offset ends 62, 62a of the lock bars with opposing ratchet teeth 61, 61a, it will be apparent the linear separating movement is prevented by the interlock provided and the transverse compressive force of the spring plates 55, 55a. It will further be noted that this location of the interlocking members along the neutral axis of the tire insert has the dual advantage of minimizing stress on the interlocking members and providing redundance in the interlocking function.

Separation is best effected by pivoting the arcuate members 51, 51a about the axis of the joint; and inner surfaces of the reduced thickness portions 52, 52a are provided with shallow recesses 64, 64a outwardly of the bars 59, 59a in alignment with the ratchet teeth 61, 61a and extending to the convexly curved ends 53, 53a affording clearance for the offsets 62, 62a as they slidably disengage the ratchet teeth 61, 61a. To facilitate such slidable disengagement, particularly on larger tire inserts, the ratchet teeth 61, 61a and the offsets 62, 62a can have a curvature with respect to the axis of pivotal movement as earlier described.

It will be apparent that the form of lock joint shown in FIGS. 11 to 13 lends itself to mechanical closing during automatic tire mounting as well as to manual closing in which strategically located apertures 21, 21a facilitate application of needed closing force as earlier described.

Various changes and modifications in the run-flat tire insert or safety roller with automatic joint as herein described may occur to those skilled in the art, and to the extent that such changes and modifications are embraced by the appended claims, it is to be understood that they constitute part of the present invention.

I claim:

1. A run-flat insert for inflatable tires of the tubeless type wherein beads at the inner periphery of the tire are adapted to sealably engage side flanges of a mounting rim, said insert comprising a plurality of arcuate members, each of said arcuate members having at each end coupling portions of generally circular convex and/or concave contour interfitting with coupling portions on adjacent members to align said members within a common plane while permitting relative pivotal movement within said plane, means for detachably securing together said interfitting coupling portions to thereby assemble said arcuate members as a ring member having an inner periphery firmly and circumferentially engaging said rim and an outer periphery protruding beyond the flanges of said rim, said securing means at one pair of interfitting coupling portions comprising cooperating automatic lock means, restraining circumferential separation of said coupling portions, said lock means being engagable by movement of said coupling portions toward each other in the direction perpendicular to a radius of said ring passing therethrough and disengagable by divergent pivoting of the arcuate members at said joint, and said securing means at interfitting coupling portions remote from said one pair comprising bolt means at the pivot centers of said coupling ends and disposed perpendicularly to the plane of said arcuate members.

2. A run-flat insert for inflatable tires as defined in claim 1, wherein said automatic lock means comprises tooth means on one arcuate member engaging ratchet means on the other arcuate member, with the point of engagement between said tooth means and ratchet means being radially spaced from the pivot center of said joint in a direction circumferentially of said ring member.

3. A run-flat insert for inflatable tires as defined in claim 2, wherein said tooth and ratchet means have a minimal dimension radially of said ring member, thereby facilitating disengagement by divergent movement of said arcuate members about the pivot axis of said joint.

4. A run-flat insert for inflatable tires as defined in claim 2, wherein said tooth and ratchet means have a minimal dimension radially of said ring member, thereby facilitating disengagement by divergent movement of said arcuate members about the pivot axis of said joint, and said tooth and ratchet means having a curvature the radius of which approximates the distance from said pivot axis.

5. A run-flat insert for inflatable tires as defined in claim 1, wherein the interfitting coupling portions remote from said automatic joint comprise arcuate member ends of reduced thickness each having interfitting portions of convex and concave curvature.

6. A run-flat insert for inflatable tires as defined in claim 5, wherein the bolt means at the pivot centers of said coupling portions provides threaded engagement with one coupling portion and beveled clamping and aligning engagement with the other of said coupling portions.

7. A run-flat insert for inflatable tires as defined in claim 6, wherein the tapered engagement with said last named coupling portion is provided by a detachable washer-like member having an off-centered tapered aperture therein and recessed means for selectively locating said aperture at either of two positions longitudinally of said arcuate member.

8. A run-flat insert for inflatable tires as defined in claim 7 wherein said recessed means is a circular depression in said coupling end having screw sockets at diametrically opposed points longitudinally of said arcuate member aligning with diametrically opposed screw apertures in said washer-like member.

9. A run-flat insert for inflatable tires as defined in claim 7, wherein said recessed means comprises a generally circular depression in said coupling end having parallel flattened sides extending longitudinally of said arcuate member and adapted to receive a similarly contoured, flat-sided, washer-like member.

10. A run-flat insert for inflatable tires as defined in claim 2, wherein said automatic joint comprises arcuate member ends of reduced thickness each having interfitting portions of convex and concave curvature, a resilient tooth means being supported adjacent and extending beyond each concave portion, and ratchet means being secured to the outer surface of and adjacent each convex portion, and each arcuate member end carries both resilient tooth means and ratchet means.

11. A run-flat insert for inflatable tires as defined in claim 10, wherein said tooth means is an offset in an enlarged spring member providing transverse compression in said automatic joint.

12. A run-flat insert for inflatable tires as defined in claim 2, wherein said automatic joint comprises arcuate member ends of reduced thickness having interfitting portions of convex and concave curvature, each such end having a spring plate secured adjacent the concave curvature to overlie said reduced thickness portion providing transverse compression in the interfitting assemblage, and opposed faces of said reduced thickness portions carrying similar interlocking members, each having said tooth means and ratchet means, whereby said interlocking members engage at the center of the overlapping joint, along the neutral axis of said insert.

13. A run-flat insert for inflatable tires as defined in claim 12, wherein said interlocking members are elongated bars disposed diametrically of said reduced thickness portions in a direction which is circumferentially oriented with respect to the assembled insert, one end of each bar adjacent said convex curvature carrying depressed ratchet means, and the other end of each bar adjacent said concave curvature carrying protruding tooth means.

14. A run-flat insert for inflatable tires as defined in claim 13, wherein the inner face of each reduced thickness portion has a shallow extending outwardly from said bar in alignment with the ratchet means thereof, and extending to said convex curvature, providing clearance for the protruding tooth means of the opposed bar as it disengages said ratchet means in the divergent pivoting of said joint.

15. A run-flat insert for inflatable tires as defined in claim 13, wherein each bar is formed of spring material, and the associated reduced thickness portion is provided with a shallow recess permitting flexure of the tooth carrying end of said bar as it rides over and engages ratchet means of the opposed bar.

16. A run-flat insert for inflatable tires as defined in claim 2, wherein said automatic joint comprises a full thickness arcuate member end of concave curvature interfitting with a full thickness arcuate member end of convex curvature, opposed surfaces of said first end having said resilient tooth means secured adjacent and extending beyond said concave curvature, and opposed surfaces of said second end carrying said ratchet means inwardly of the convex curvature thereof and in position to align with said tooth means on said first end.

17. A run-flat insert for inflatable tires as defined in claim 16, wherein each tooth means is an offset in an enlarged spring member providing transverse compression in said automatic joint.

18. A run-flat insert for inflatable tires as defined in claim 16, wherein the interfitting coupling portions remote from said automatic joint also comprise a full thickness arcuate member end of concave curvature interfitting with a full thickness arcuate member end of convex curvature, said first end carrying at opposed surface thereof enlarged flanges protruding beyond said convex surface and adapted to overlie opposed surfaces of said other end, and said bolt means passing through aligned apertures in said flanges and second named end into threaded means integral with one of said flanges.

19. A run-flat insert for inflatable tires as defined in claim 2, wherein said tooth means comprises an offset on an enlarged spring plate adapted to overlie an elongated bar carrying said ratchet means, and said spring plates at opposite surfaces of said ring providing transverse compression in said automatic joint.

20. A run-flat insert for inflatable tires as defined in claim 1, wherein each arcuate member has, adjacent each coupling end thereof and close to the outer periphery of said ring, socket means facilitating assembly and disassembly of said insert, said socket means comprising an aperture extending transversely therethrough adapted for insertion of a rod perpendicularly to the common plane of said arcuate members, said aperture being located outwardly of an insert annulus passing through the pivot centers of said coupling ends whereby such inserted rod serves to pry aside a tire bead making the joint area accessible for assembly and disassembly.

21. A run-flat insert for inflatable tires as defined in claim 1, wherein each arcuate member has, adjacent each coupling end thereof and close to the other periphery of said ring, socket means facilitating assembly and disassembly of said insert, said socket means comprising an aperture extending transversely therethrough adapted for insertion of a rod perpendicularly to the common plane of said arcuate members, said aperture being located outwardly of an insert annulus passing through the pivot centers of said coupling ends whereby two such inserted rods at opposed sides of a joint serve to pry aside a tire bead making the joint area accessible, and in conjunction with a restrictive loop around said rods, enable the application of concentrated manual force in displacing any tire bead interference and bringing said arcuate members into close circumferential engagement with said rim.

22. The method of installing a run-flat safety means in inflatable tires in association with equipment automatically mounting tires on wheel rims that comprises, inserting within a tire the arcuate members of a run-flat insert as defined in claim 1, joining together the interfitting coupling ends for which the securing means comprise said bolt means, pivotally separating said partially assembled arcuate members to the fullest extent possible within the tire, automatically mounting the tire, with the extended insert therein, on the wheel rim in the conventional manner, and then, with the tire deflated, applying radial pressures in substantial force at a plurality of circumferentially spaced points to compress the tire tread against said arcuate members, thereby pivotally moving said arcuate members to rim engaging configurations while engaging the automatic lock means of said one pair of interfitting coupling portions.

23. The method as defined in claim 22, wherein said insert comprises two arcuate members, and external forces are applied at diametrically opposed positions with respect to said tire.

24. The method of manually installing an automatic locking run-flat safety means in an inflatable tire and rim assemblage that comprises, inserting within a tire the arcuate members of a run-flat insert as defined in claim 20, joining together the interfitting coupling ends for which the securing means comprise said bolt means, passing one tire bead over one rim flange, fully extending the insert sub-assemblage and passing the same over the same rim flange and into the space between the flanges, inserting elongated rods of the jack-handle type into said apertures at opposed sides of the automatic joint, placing a restricting loop around said rods intermediate the ends thereof, applying divergent force to the outer ends of said rods to thereby move said arcuate members into firm circumferential engagement with said rim while operatively engaging said automatic lock means, then passing the second tire bead into the space between said flanges and inflating said tire.

25. A ring insert for circumferential clamping engagement with a wheel or rim within an inflatable tire mounted thereon, said insert comprising a plurality of arcuate members having coupling ends interfitting in a manner to permit relative pivotal movement of adjacent arcuate members within the plane of said ring, all but one pair of interfitting coupling ends being joined by bolt means passing through the pivot centers thereof and disposed perpendicularly to the plane of said ring, and said one pair of coupling ends having automatic lock means restraining circumferential separation of said coupling ends, said lock means including protruding means on one coupling portion of said pair coacting with detent means on the interfitting coupling portion of said pair, and said protruding and detent means being engageable by convergent pivotal movement of said arcuate members about the bolt means at the opposed ends thereof.

* * * * *